(12) United States Patent
Sifel et al.

(10) Patent No.: US 6,432,506 B1
(45) Date of Patent: Aug. 13, 2002

(54) ORGANIC SHELL BLANK AND METHOD FOR MAKING SAME

(76) Inventors: Lawrence J. Sifel, 1030 Woodburn Hill Rd., Mechanicsville, MD (US) 20659; Charles W. Erikson, 18072 Greenhorn Rd., Grass Valley, CA (US) 95945

(*) Notice: Subject to any disclaimer, the term of this patent is extended or adjusted under 35 U.S.C. 154(b) by 0 days.

(21) Appl. No.: 09/722,359

(22) Filed: Nov. 28, 2000

Related U.S. Application Data

(62) Division of application No. 09/008,780, filed on Jan. 20, 1998, now Pat. No. 6,190,491, which is a division of application No. 08/612,733, filed on Dec. 21, 1995, now Pat. No. 5,776,581.

(51) Int. Cl.[7] ................................................. B32B 5/12
(52) U.S. Cl. ........................... 428/105; 428/15; 428/16; 428/114; 84/268; 84/291
(58) Field of Search ............................ 428/105, 15, 16, 428/114, 57, 58, 220, 542.2, 542.6; 84/268, 291; 156/182, 264, 263, 256, 293, 63, 304.1, 196, 221, 222, 285, 8.7

(56) References Cited

U.S. PATENT DOCUMENTS

| 254,945 A | * | 3/1882 | Fest | 156/154 |
|---|---|---|---|---|
| 509,359 A | | 11/1893 | Brennan | 428/15 |
| 539,719 A | | 5/1895 | Bechtold | 428/15 |
| 1,372,555 A | | 3/1921 | Sato | 428/15 |
| 3,969,558 A | | 7/1976 | Sadashige | 428/58 |
| 4,916,995 A | | 4/1990 | Soler et al. | 84/291 |
| 5,091,136 A | * | 2/1992 | Bock et al. | 264/320 |
| 5,593,530 A | | 1/1997 | Hashiguchi | 156/260 |

FOREIGN PATENT DOCUMENTS

| KR | 92-8871 | 10/1992 |
|---|---|---|
| KR | 93-10627 | 11/1993 |

* cited by examiner

*Primary Examiner*—Linda Gray
(74) *Attorney, Agent, or Firm*—Finnegan, Henderson, Farabow, Garrett & Dunner, L.L.P.

(57) ABSTRACT

An organic shell inlay blank is provided including a first layer of organic shell matter having two opposed surfaces defining a first thickness therebetween rendering the first layer flexible, a second layer of organic shell matter having two opposed surfaces defining a second thickness therebetween rendering the second layer flexible. One of the surfaces of the first layer substantially overlaps and is secured to one of the surfaces of the second layer. A bonding agent secures the layers together to form the inlay blank. A method for manufacturing an organic shell inlay blank is also disclosed and includes the steps of cutting a plurality of flexible pieces of organic shell matter from an organic shell, stacking the pieces in a substantially overlapping relationship with a bonding agent between the pieces, and urging the pieces together while the bonding agent cures to form the inlay blank.

5 Claims, 6 Drawing Sheets

ORGANIC SHELL BLANK AND METHOD FOR MAKING SAME

This is a division of application Ser. No. 09/008,780, filed Jan. 20, 1998, U.S. Pat. No. 6,190,491, which is a divisional of application Ser. No. 08/612,733, filed Dec. 21, 1995, now U.S. Pat. No. 5,776,581, all of which are incorporated herein by reference.

BACKGROUND OF THE INVENTION

The present invention relates to an organic shell blank that can be used, for example, to manufacture a decorative inlay, and method for making such an organic shell blank. More particularly the invention relates to organic shell inlay blanks made from a plurality of pieces of organic shell matter, and a method for joining those pieces together.

Inlays and overlays made from organic shells, such as abalone, oyster, etc., have been used for many years as decorative items on objects such as musical instruments, furniture, and cutlery. As used herein, an "overlay" is a shell portion thin enough that, when placed atop a smooth surface, the smooth surface can be coated with a finish material such as lacquer until the top surface of the overlay is flush with the lacquer coating the smooth surface. Typically, overlays are no thicker than about 0.015 inches, and are usually about 0.004–0.006 inches. As used herein, an "inlay" is a shell portion thick enough that building up a smooth surface adjacent the shell portion with lacquer would be difficult or impossible. Thus, an inlay would undesirably protrude from the smooth surface if not inlaid into a depression in the surface. Typically, inlays are thicker than about 0.015 inches, and may be as thick as 0.25 inches or more, limited ultimately by the size and curvature of the shell from which the inlay is taken.

As shown in FIG. 8, inlays and overlays are usually made from substantially flat or slightly rounded portions A of a shell B that are ground until flat. If an inlay is desired, each shell portion A is ground until it has the desired thickness. If an overlay is desired, the shell portion A may be ground to the desired overlay thickness, or ground to a larger thickness (such as that shown) and then sliced to a desired overlay thickness. In making such inlays or overlays, the area of any substantially flat or slightly rounded shell portion A that can be cut from the shell B is necessarily limited by the shell's thickness and curvature. Also, much of the shell B may be wasted because of the large area C that must be ground or trimmed off the shell to derive various small pieces from a large shell, so that any single piece is not overly curved.

As shown in FIG. 9, in order to obtain larger overlays, a curved portion D larger than the substantially flat or slightly rounded portion A described above can be cut from a shell E. The curved shell portion D can be sliced, parallel to the curvature, into curved veneers F having a thickness suitable for use as an overlay. The curved veneers F, being thin or flexible, are flattened, and can be glued together to form an overlay sheet.

The use of such overlay sheets is known in the Orient as raden or kaisuri (Japanese); lo-tian (Chinese); and najon (Korean). The overlay shell is classified according to its thickness, thinnest to thickest, as follows: aogai, kinuzuri, uso-gai, atsu-gai, and maru-gai.

However, the overlay sheets described above have several drawbacks. First, the thin sheets (0.004 to 0.015 inches thick) can be difficult to sand and trim because they are very brittle. This brittleness also makes working with larger sheets difficult, making unintentional breakage a problem.

Second, using some types of shell, these thin sheets become too transparent, and the seams between joined pieces become too obvious.

Third, the sheets are not suitable for use as inlays, which are often inlaid into a mounting surface with some part of the inlay extending from the surface, and then shaped to be flush with the surface by, for example, sanding the extending part until it is flush with the surface. Inlay sheets are too thin to be sanded without being broken or completely sanded off. This problem is especially heightened when placing shell into a curved surface.

Traditional inlays are also subject to several drawbacks. First, the size of the individual inlay pieces is limited by shell curvature.

Second, because shell coloration often varies layer by layer through the shell, grinding a shell into a flat piece may entail passing through many differently colored layers around the perimeter of the piece, leading to an uneven appearance.

SUMMARY OF THE INVENTION

The objects of the present invention are to provide a low cost organic shell inlay blank that is simple to make, easy to work with, and visually appealing.

To achieve the objects, and in accordance with the purpose of the invention includes an organic shell inlay blank comprising a first layer of organic shell matter having two opposed surfaces defining a first thickness therebetween rendering the first layer flexible A second layer of organic shell matter has two opposed surfaces defining a second thickness therebetween rendering the second layer flexible. One of the surfaces of the first layer substantially overlaps and is secured to one of the surfaces of the second layer. A bonding agent secures the layers together to form the inlay blank.

In another aspect, the invention may include more than two layers bonded together.

The invention also includes a method for manufacturing an organic shell inlay blank comprising the steps of cutting a plurality of flexible pieces of organic shell matter from an organic shell, stacking the pieces in a substantially overlapping relationship with a bonding agent between the pieces, and urging the pieces together while the bonding agent cures to form the inlay blank.

In yet another aspect, the invention includes a method for manufacturing an organic shell inlay blank comprising the steps of cutting a plurality of flexible pieces of organic shell matter from an organic shell, arranging the pieces without substantially overlapping their edges with a bonding agent between the edges, urging the pieces together while the bonding agent cures to form a sheet, repeating the cutting, arranging, and urging steps at least once until a plurality of sheets is formed, stacking the formed sheets with a bonding agent between the sheets, and urging the sheets together while the bonding agent cures to form the inlay blank.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the written description and claims, as well as the appended drawings.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification, illustrate several embodiments of the invention and together with the description serve to explain the principles of the invention.

DESCRIPTION OF THE PREFERRED EMBODIMENTS

Reference shall now be made in detail to the present preferred embodiments of the invention, examples of which are illustrated in FIGS. 1–7. Wherever possible the same reference numbers will be used throughout the drawings to refer to the same or like parts.

According to the invention, the preferred embodiment of the invention includes an organic shell inlay blank comprising a first layer of organic shell matter having two opposed surfaces defining a first thickness therebetween rendering the first layer flexible. As broadly embodied in FIG. 1, an organic shell blank 20 includes a first layer 22 of organic shell matter. The organic shell matter may be taken from any known type of organic shell conventionally used in inlay or overlay work.

Figure 1:
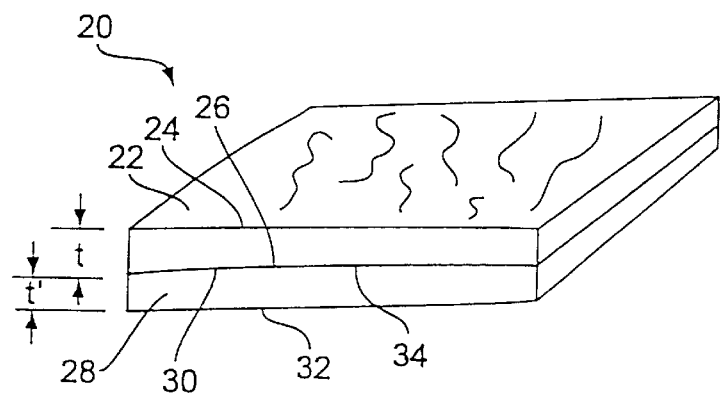
FIG. 1 is a perspective view of an organic shell blank according to a first embodiment of the present invention.
Figure 2:
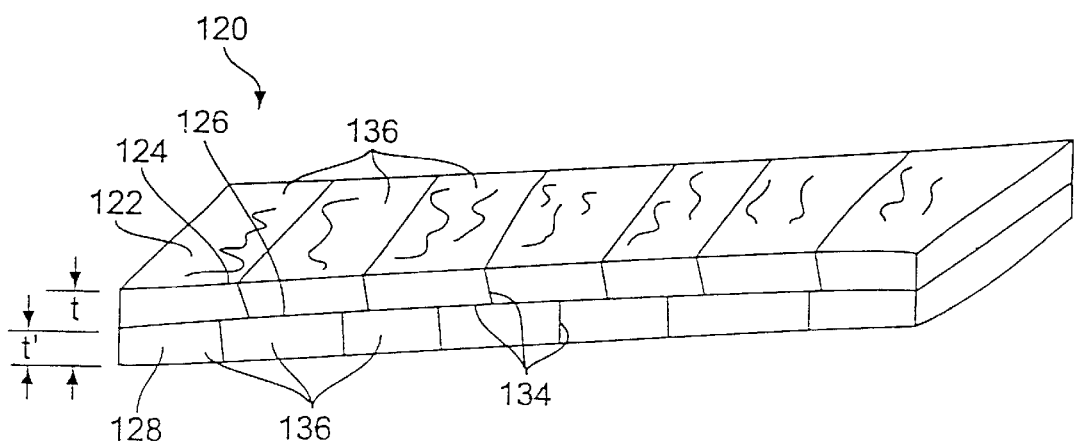
FIG. 2 is a perspective view of an organic shell blank according to a second embodiment of the present invention.

As shown in FIG. 1, the first layer 22 has a thickness t defined by two surfaces 24, 26. The thickness t is chosen to allow the layer to be bent without breaking. Preferably, the first layer 22 has a thickness of about 0.004 to 0.015 inches. Due to inherent brittleness attributable to their chemical composition, most flexible layers have a thickness t no greater than about 0.015 inches. If the thickness is greater than 0.015 inches, the first layer 22 may undesirably fracture when bent.

According to the invention, a second layer of organic shell matter is provided having two opposed surfaces defining a second thickness therebetween rendering the second layer flexible. As broadly embodied in FIG. 1, the blank 20 includes a second layer 28 having two surfaces 30, 32 defining a thickness t'. therebetween. Layer 28 is also flexible like layer 22. Typically, the thicknesses of the first and second layers t and t' are substantially equal, for ease of manufacturing. However, if desired, t and t' could be different if attempting to achieve a given blank thickness that is not a factor of t or t'. For example, if t=0.010 inches and t'32 0.005, and a 0.045 inch thick blank is desired, four pieces t thick and one piece t' thick could be used.

In accordance with the invention, one of the surfaces of the first layer substantially overlaps and is secured to one of the surfaces of the second layer. As broadly shown in FIG. 1, surface 26 of layer 22 substantially covers surface 30 of layer 28

According to the invention, a bonding agent secures the layers together to form the inlay blank. As shown in FIG. 1, a bonding agent 34 is supplied between the surfaces 26 and 30 to secure the layers 22, 28 together to form the blank 20. Preferably, the bonding agent 34 comprises a glue such as an epoxy or cyanoacrylate. Further, the amount of the bonding agent 34 utilized between the first and second layers 22, 28 is preferably minimized. That is, no more bonding agent than is required to securely bond the layers 22, 28 together is used. Thus, the contact between the surfaces 26, 30 is maximized. Use of small amounts of the bonding agent 34 allows the bonding agent to be essentially invisible in any finished product made from the blank 20.

As shown in FIG. 1, the first and second layers each include only a single piece of organic shell material. Thus, if the blank desired has a small area, each layer may be made of a single piece of shell, giving the blank an area substantially equal to that of the individual shell pieces.

However, in a second embodiment of the invention, a blank is provided in which the first and second layers each include a sheet of organic shell material, each sheet being made of a plurality of substantially non-overlapping pieces of organic shell material joined by a bonding agent. As broadly embodied in FIG. 2, blank 120 includes first and second layers 122, 128 joined together by a bonding agent 134. Each of the layers 122, 128 is made from several pieces 136 of organic shell matter joined by a bonding agent 134. Layer 122 has surfaces 124, 126 defining a thickness t therebetween, and layer 128 has surfaces 130, 132 defining a thickness t'.

Figure 3:
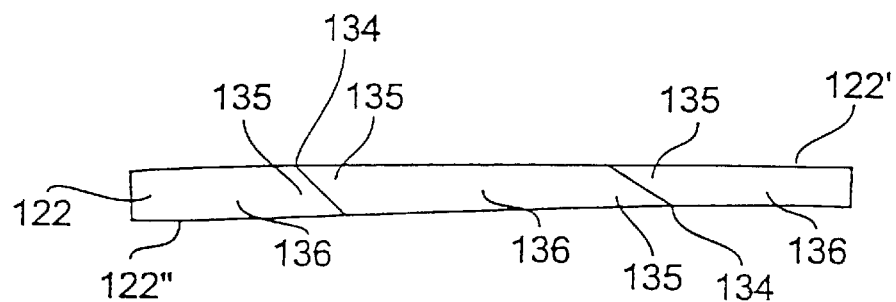
FIG. 3 is a sectional view of a sheet of shell material which may be used to form the blank of FIG. 2.
Figure 4:
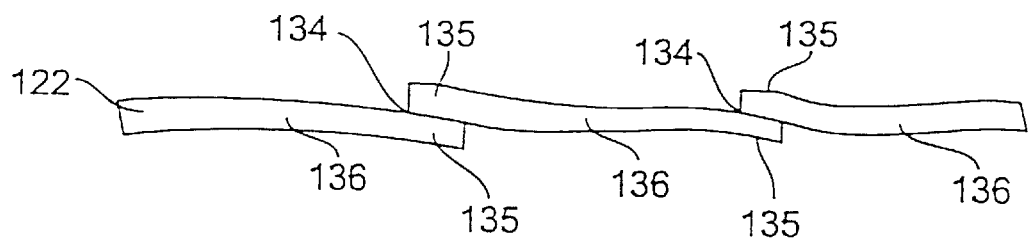
FIG. 4 is a sectional view of the sheet of FIG. 3 prior to sanding.
Figure 5:
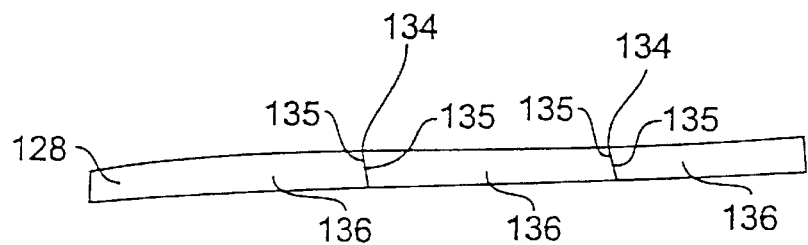
FIG. 5 is a sectional view of an alternate sheet of shell material which may be used to form the blank of FIG. 2.
Figure 6:
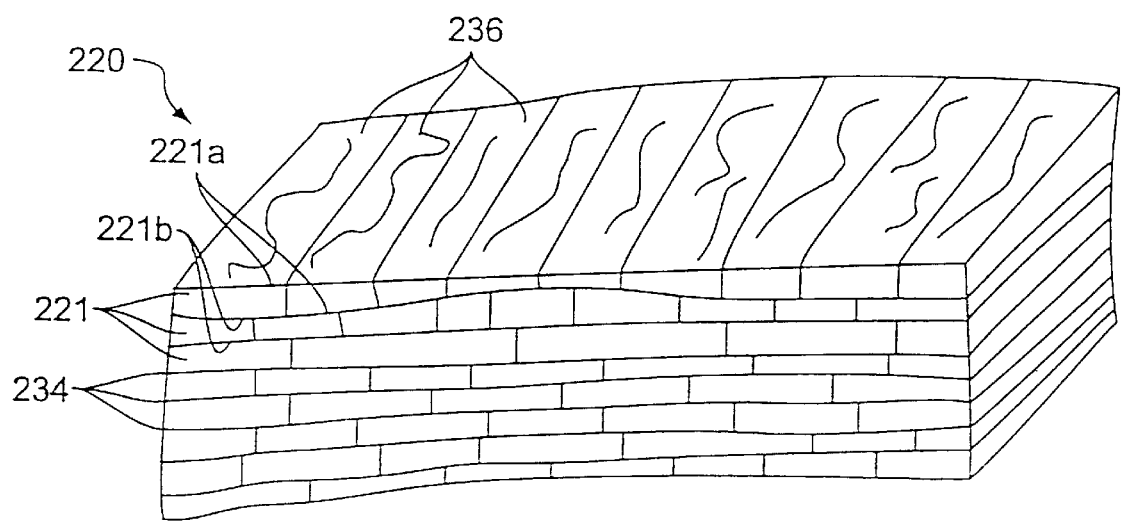
FIG. 6 is a perspective view of a flat organic shell blank according to a third embodiment of the present invention.

As shown in FIG. 3, layer 122 is made of a number of pieces 136 arranged side by side with a small amount of overlap between edges 135 of adjacent pieces such that the edges have a somewhat mitered appearance. FIG. 4 shows the slightly overlapping orientation of the pieces 136 before they are sanded into the smooth layer 122 of FIG. 3 and secured to the other layer 128, as will be described below. Alternatively, as shown in FIG. 5, layer 128 is made of a number of pieces 136 that are arranged so that their edges do not overlap. The methods of construction of slightly overlapping and non-overlapping layers will be described in more detail below. It should be understood that the sheets of FIGS. 3 and 5 are both suitable for use in combination with each other or with like sheets within the scope of the invention. The example shown in FIG. 2 of joining together two types of sheet is thus demonstrative only, and is not to be considered limiting of the invention.

Preferable inlay blank thicknesses include 0.030, 0.040, and 0.060 inches, because these sizes have been made by traditional methods. Blanks of these thicknesses can be made of various combinations of 0.010, 0.012, or 0.015 inch thick shell pieces, as required or desired. However, inlay blanks as thick as 0.250 inches or more can be constructed, according to the present invention.

In a third embodiment of the invention, an organic shell inlay blank is provided including a plurality of layers of organic shell matter, each layer having two opposed surfaces defining a thickness therebetween rendering each layer flexible, the layers being stacked with substantial overlap, and a bonding agent disposed between the stacked layers joining the plurality of layers together to form the inlay blank. As broadly embodied in FIG. 6, an organic shell blank 220 includes a plurality of layers 221 of organic shell matter. The layers 221 are stacked one atop another, and five layers, ten layers, or more may be included within the scope of the invention. A bonding agent 234 between opposed surfaces 221a, 221b of adjacent layers bonds the blank together. The layers 221 have a thickness that allows them to be bendable, as described above, and they are stacked with substantial overlap. The layers 221 may be made of pieces 236 with edges arranged either slightly overlapping as shown in FIG. 3 or non-overlapping as shown in FIG. 5.

Figure 7:
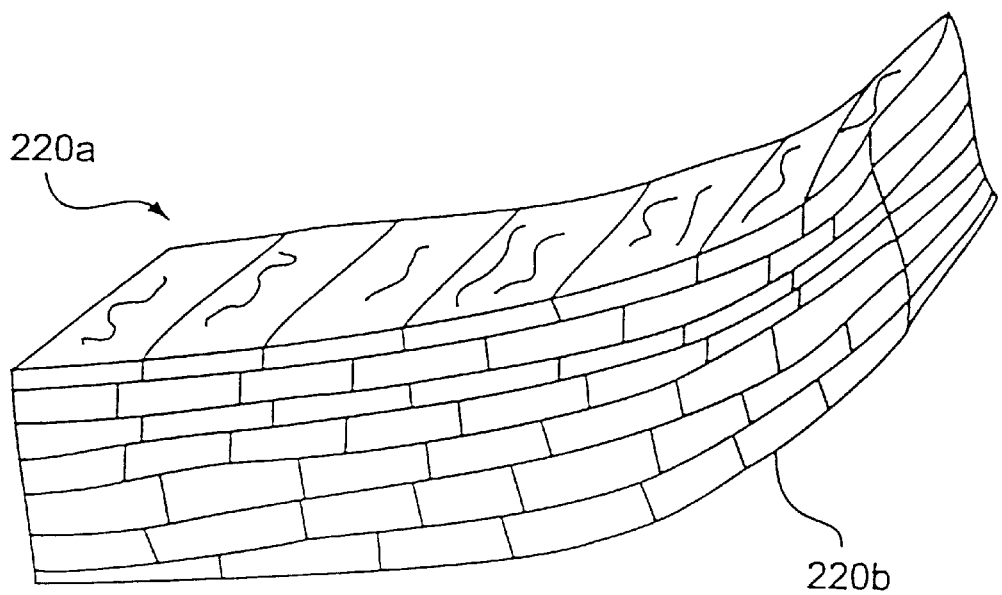
FIG. 7 is a perspective view of a curved organic shell blank according to the third embodiment.
Figure 8:
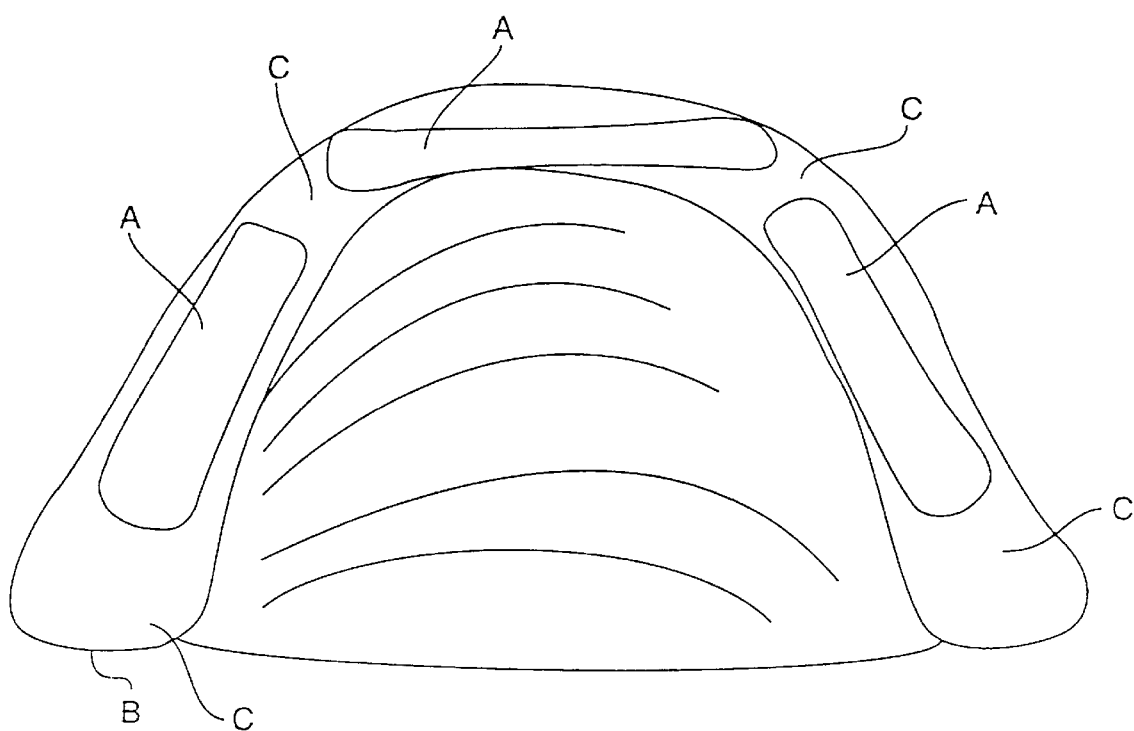
FIG. 8 is a diagrammatical sectional view of conventional inlay pieces obtainable from a shell.
Figure 9:
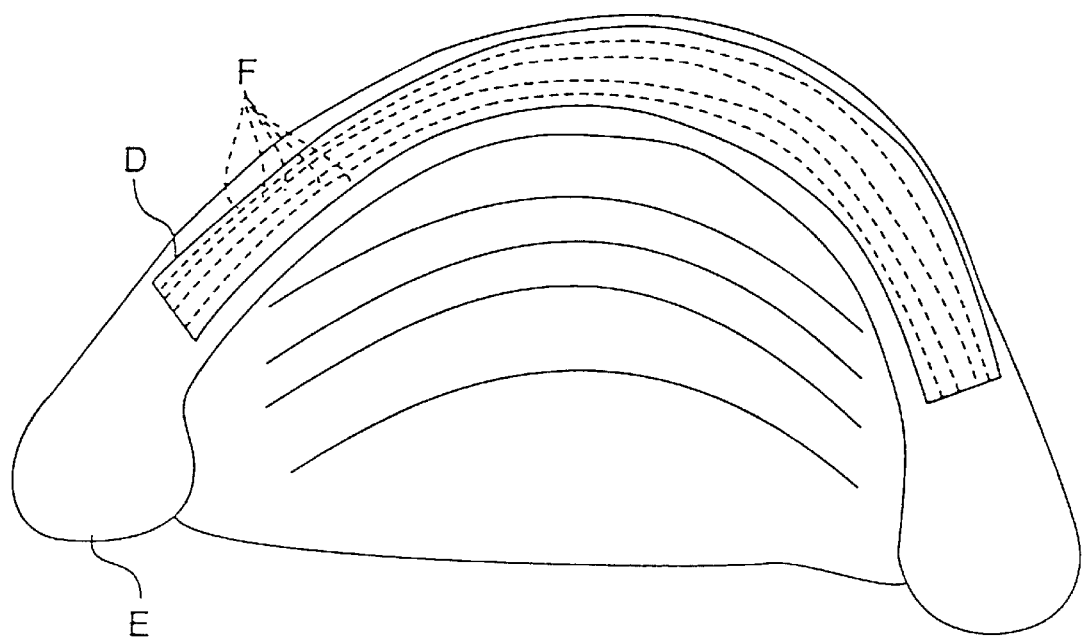
FIG. 9 is a diagrammatical sectional view of conventional overlay pieces obtainable from a shell.

As an option, an organic shell blank can be made with an at least slightly curved cross-section. As shown in FIG. 7, an organic shell blank 220a made according to the third embodiment has a curved portion 220b. The curving is achieved by urging the sheets together in a curved form until the bonding agent cures. Making such a curved inlay blank provides a uniform grain distribution not achievable using traditional inlay blanks, in which making curved portions often requires sanding through several layers of the shell.

In accordance with the invention, a method for making organic shell inlay blanks is also provided. A first embodiment of the method includes the steps of cutting a plurality of flexible pieces of organic shell matter from an organic shell, stacking the pieces in a substantially overlapping relationship with a bonding agent between the pieces, and urging the pieces together while the bonding agent cures to form the inlay blank.

In order to practice the above method, an organic shell is chosen, and the outside surface of the shell is typically ground or polished to the nacreous underlayer to remove conchyolin ("bark"), worm holes, and other imperfections. The outside surface is then ground with a grindstone until the surface is substantially spherical or domed. The inside surface of the shell is also ground until it is substantially concentric with the outside surface of the shell. Thus, the shell has a uniform thickness between the surfaces, typically between 0.020 and 0.750 inches, depending of course on the dimensions of the original shell chosen.

Once prepared, the smooth shell is usually then cut into a number of strips using, for example, a diamond-edged band saw or a diamond or carborundum circular saw. The size of the strips depends on the size and shape of the shell, and the desired application. The strips are then cut into the plurality of flexible pieces of organic shell matter referred to above. The strips may be cut using a diamond-edged band saw having a power feed capable of cutting compound curves. In order to ensure that the pieces are flexible, their thickness should be approximately 0.015 inches or less, depending on the specific characteristics of the shell chosen. Preferably, the thickness of the pieces is from about 0.004 to 0.015 inches.

If the flexible pieces are curved and a flat blank is desired, the method preferably further includes the step of flattening the pieces after the cutting step. Flattening can be achieved by pressure cooking or steaming the pieces, soaking the pieces in a liquid, and/or applying weight to the pieces. These processes may not achieve total flattening of the pieces, which would be achieved during the urging together step, to be describe below.

The stacking/bonding step is then performed, and this step can differ depending on the type of bonding agent chosen. For example, if an epoxy is used, the drying time of the epoxy will permit alternating the stacking of pieces with the placing of bonding agent between the pieces prior to the hardening of the epoxy. Therefore, the urging together step, to be described below, can be performed after all of the pieces have been stacked. However, if a cyanoacrylate is used, the drying time is typically so short that the urging step must be repeated for each piece being stacked. That is, cyanoacrylate is placed on the top surface of a piece, another piece is stacked on top, the pieces are urged together, and then the steps are repeated until the stack is complete. Either of these two described sub-methods are acceptable, depending on the type of bonding agent used. The minimal amount of bonding agent needed to secure together the pieces is desired to improve the appearance to the resulting blank.

The urging together step may be performed using various types of equipment. For example, weights can be used to urge the pieces together between two surfaces. Alternatively, various types of presses can be used. For example, a mechanical press, a pneumatic press, or a vacuum press can be used. The pieces can be urged together between substantially planar surfaces or curved surfaces, depending on the application. Preferably, the urging will maximize contact between adjacent pieces and squeeze any excess bonding agent present from between the pieces.

If desired, the cutting and stacking steps may include cutting pieces from the shell in a given sequential order and stacking the pieces in that sequential order. Since each of the pieces has an oriented grain pattern which could show through from one piece to another, by placing the layers one atop another so that the oriented grain patterns overlap the patterns below, an inlay blank may be created having the appearance of the original shell. That is, the blank will appear to have a surface depth substantially as thick as the depth of the original shell with the different layers of material showing, at least somewhat, through to the top layer. Thus, a curved shell can be essentially reconstituted, with minimal loss of volume, as a flat shell using the above method.

The present invention also includes a second method for manufacturing an organic shell inlay blank comprising the steps of cutting a plurality of flexible pieces of organic shell matter from an organic shell. Then, the pieces are arranged without substantially overlapping their edges and with a bonding agent between the edges. The pieces are then urged together while the bonding agent cures to form a sheet. The cutting, arranging, and urging steps are repeated at least once until a plurality of sheets is formed. The formed sheets are stacked with a bonding agent between the sheets, and then the sheets are urged together while the bonding agent cures to form the inlay blank.

The second method shares a number of features with the first method described above, and these features will be described only briefly here. For example, the pieces cut from the shell are similar, and the preparation of the shell prior to cutting the pieces is similar to that described above. However, in the second method the pieces are arranged without substantially overlapping the edges. Thus, in the arranging step, the pieces are placed so that once the bonding agent cures and the pieces are urged together a sheet will be formed. The pieces can be arranged with slight overlap between the edges, the overlap being sanded off once the pieces are urged together to provide a substantially flat sheet (see FIGS. 3 and 4). Alternately, if the edges are cut precisely, the arranging step can be performed with the edges butted together so that there is no overlap (see FIG. 5). Thus, less sanding is required to smooth the sheet after the bonding agent cures. The pieces can be urged together using the same equipment described above in connection with the first method.

The stacking and urging steps of the second method are essentially similar to the stacking and urging steps of the first method, except in the second method sheets, rather than pieces, are stacked. The sheets can be of essentially unlimited size, depending on how the pieces were arranged during the arranging step. Thus the resulting inlay blanks can be substantially larger than previously obtainable, and can be several times larger than any available shell.

Applicants estimate that, by using the above methods, as much of 80% of a shell can be made into an inlay blank, compared to the less than 5% possible from some shells using traditional methods of making inlay blanks. Also, the above methods allow shell species too curved or too thin to be used as traditional inlay blanks in the past to be used in inlay work for the first time. Further, the above methods allow different species of shell to be joined together in an inlay blank.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An organic shell inlay blank comprising:

a first sheet of nacreous shell matter;

a second sheet of nacreous shell matter, said first sheet being stacked on said second sheet, said first sheet being sufficiently thin that at least a portion of said second sheet is visible through said first sheet when stacked;

a bonding agent interposed between said first and second sheets to hold said first and second sheets together;

said first and second sheets having patterns thereon; and whereby said first sheet is stacked on the second sheet such that the patterned appearance of said second sheet is coordinated with respect to said first sheet.

2. The blank as defined in claim 1, wherein said first and second sheets have a thickness of about 0.004 to about 0.015 inches.

3. The blank as defined in claim 1, wherein each of said first and second sheets is formed by two or more integrally connected pieces of nacreous shell matter.

4. The blank as defined in claim 1, wherein the first and second sheets each includes only a single piece of nacreous shell matter.

5. The blank as defined in claim 1, wherein the blank includes three or more sheets of nacreous shell matter each having a thickness of about 0.004 to about 0.015 inches.

* * * * *